United States Patent [19]
Safyan

[11] Patent Number: 5,941,077
[45] Date of Patent: Aug. 24, 1999

[54] CHILL-HOT BUFFET SERVING TRAY

[76] Inventor: Bernard Safyan, 6667 Maryland Dr., Los Angeles, Calif. 90048

[21] Appl. No.: 09/217,027

[22] Filed: Dec. 21, 1998

[51] Int. Cl.$^6$ ..................................................... F25B 21/02
[52] U.S. Cl. .............................. 62/3.3; 62/3.7; 62/457.9
[58] Field of Search ................................... 62/3.3, 457.9, 62/3.7

[56] References Cited

U.S. PATENT DOCUMENTS

| | | | |
|---|---|---|---|
| 3,808,825 | 5/1974 | Ciurea | 62/3 |
| 4,823,554 | 4/1989 | Trachtenberg et al. | 62/3 |
| 5,209,069 | 5/1993 | Newnan | 62/3.64 |
| 5,301,508 | 4/1994 | Kahl et al. | 62/3.62 |
| 5,319,937 | 6/1994 | Fritsch et al. | 62/3.62 |
| 5,362,983 | 11/1994 | Yamamura et al. | 257/414 |
| 5,522,225 | 6/1996 | Eskandari | 62/3.7 |
| 5,588,300 | 12/1996 | Larsson et al | 62/3.61 |
| 5,718,124 | 2/1998 | Senecal | 62/457.6 |
| 5,782,094 | 7/1998 | Freeman | 62/3.6 |
| 5,842,353 | 12/1998 | Kuo-Liang | 62/190 |

*Primary Examiner*—Henry Bennett
*Assistant Examiner*—Muh Suhr
*Attorney, Agent, or Firm*—Lewis B. Sternfels

[57] ABSTRACT

A heating and cooling tray (10) for service of food comprises housing (12) which supports a Peltier temperature controlling unit (22, 24) having an air flow passageway therein. The housing includes upper and base portions (14, 16) having respective openings (60, 62) for receiving and supporting different parts of the temperature controlling unit. The upper and base portions are secured together to provide an air flow path having an entry at the front of the tray where the upper and base portions are joined at an intersection (28a) and an outlet (58) at the rear of the tray between the upper and base portions, for flow of air through the entry at the intersection, the passageway in the temperature controlling unit, and out through the outlet. A pan (85) and a thermally insulating liner (92) are spaced from one another to form a gap (99) filled with a thermally insulating foam (101) and, thus, to provide enhanced thermal insulation. The liner includes a ridge (96) to insulate a heat conducting plate (78) of the temperature controlling unit.

25 Claims, 3 Drawing Sheets

CHILL-HOT BUFFET SERVING TRAY

CROSS-REFERENCE TO RELATED APPLICATION

Not Applicable

REFERENCE REGARDING FEDERAL SPONSORSHIP

Not Applicable

REFERENCE TO MICROFICHE APPENDIX

Not Applicable

BACKGROUND OF THE INVENTION

1. Field of the Invention

The present invention relates to buffet and serving trays and, in particular, to improvements in the chilling and heating of foods in such trays.

2. Description of Related Art and Other Considerations

Perishable foods for home, market, catering and restaurant buffets are conventionally chilled by ice or commercially manufactured containers of freezable material, or by refrigeration systems. When the ice melts and the freezable material warms, these cooling media lose their ability to maintain the foods safe and may render them unsuitable or hazardous for consumption. Refrigeration systems are bulky and costly, requiring condensers, coils and harmful chemicals and, further, must be serviced and maintained. Additionally, they are not easily adapted to be portable.

Some foods need to be heated or kept warm also for home, market, catering and restaurant buffet service. Conventional sources of heat are by flame and electricity, e.g. by use of hot plates. Flame sources many times produce local hot spots and uneven heating.

Efficiency in both cases of heating and cooling ofttimes is small, due to loss of cooling or heating to the environment; therefore, higher levels of heating and cooling input are required to maintain the desired or necessary level of temperature control.

If heated foods are to be served with chilled foods, it is customary to provide separate stations therefor, so that the heating and cooling will not interfere with one another. For very small or confined locations, the use of separate stations may be inconvenient.

SUMMARY OF THE INVENTION

These and other problems are successfully addressed and overcome by the present invention, which combines both heating and cooling, utilizing a thermoelectric heat pump, commonly known as Peltier thermoelectric heat pump, in a single device to provide a thermally efficient environment.

Specifically, a housing includes spaced upper and base portions having openings to receive and support a temperature controlled unit provided with an air flow driver and passageway. A pan for receiving food is positioned on the temperature controlled unit. The base portion opening provides an inlet for air, which passes through the temperature controlled unit to an outlet. Multiple temperature controlled units supported in similar openings may be used for heating and/or cooling different foods. To prevent undesired flow of air from one unit to another, baffles can be placed between the opening pairs in the spaced portions.

More specifically, the temperature controlled unit includes a heat conducting plate, a Peltier thermoelectric heat pump thermally coupled to the heat conducting plate, a finned heat sink thermally coupled to the heat pump and a fan secured to the finned heat sink. The respective openings in the portions are separated from one another. The opening in one portion supports the heat conducting plate and the thermoelectric heat pump. The opening in the base portion supports the fan. The finned heat sink resides in the separation between the openings. Thus, air from the entry passes through the heat sink fins and through the outlet.

The pan is combined with a thermally insulating liner into a unit to help prevent loss of heat or cold and, thus, to improve thermal efficiency. The pan includes a sloped annular wall, a bottom secured to the sloped annular wall and a rim extending outwardly from the sloped annular wall. The thermally insulating liner includes a similarly sloped annular wall parallel to and spaced from the pan annular wall. An annular ridge, which terminates the sloped annular wall, is bonded to the pan bottom and is configured to contact the upper portion intermediate surface, to center the pan bottom over and into contact with the heat conducting plate and to provide insulation for the heat conducting plate. A rim extends outwardly from the sloped annular wall and is bonded to the pan rim. The bonds form a hermetically sealed gap between the pan and the liner. The gap preferably is filled with a thermally insulating foam. The configuration of the liner sloped annular wall conforms to that of the upper portion sloped annular wall to enable facile insertion and removal of the pan and liner combination into the upper portion opening. A thermal lining may be placed on the underside of the upper plate if additional thermal insulation is desired.

Several advantages are derived from this arrangement. Movement of air in the tray is adeptly directed to enhance efficient temperature control. The tray is electrically connectable into a wall outlet. It comprises a minimum number of long-lasting parts. It is safer than conventional refrigeration units, in not requiring the use of gases and chemicals. Efficient use of thermal energy is assured by use of air-tight seals and to prevent the cold or hot air from dissipating from the thermally conducting plate. The plate is recessed into the tray opening, and the recess is thermally insulated to help maintain the temperature. The pan, or serving dish, is housed in a thermally insulated jacket or liner, between which the hermetically sealed gap is provided to help prevent any build-up of moisture on the underside of the pan as well as on the surface of the thermally conductive plate, particularly when used as a cold plate. The ridge on the underside of the liner provides a socket that centrally locates the pan over the thermally conducting plate and enables a fuller thermal contact of the flat bottom of the pan with the thermally conducting plate. The power unit may be positioned relatively remote from the tray to avoid heat contamination of the tray from the power supply.

A further advantage of the present invention is its design, in that it is capable of being assembled using a pre-formed upper portion, a pre-formed base portion and a pair of end caps. A center vertical partition in the upper portion, running from the front to the rear of the tray, enables the air to be moved directly and without mixing in from each of the fans to the air outlet.

Other aims and advantages, as well as a more complete understanding of the present invention, will appear from the following explanation of an exemplary embodiment and the accompanying drawings thereof.

DETAILED DESCRIPTION OF THE PREFERRED EMBODIMENTS

Figure 1:
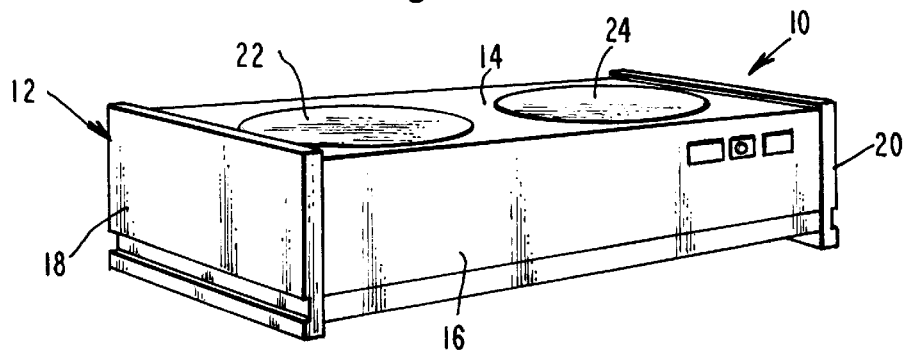
FIG. 1 is a perspective view of the present invention, viewed from its front side, showing a pair of sections with alternately operative heating and cooling units therein.
Figure 2:
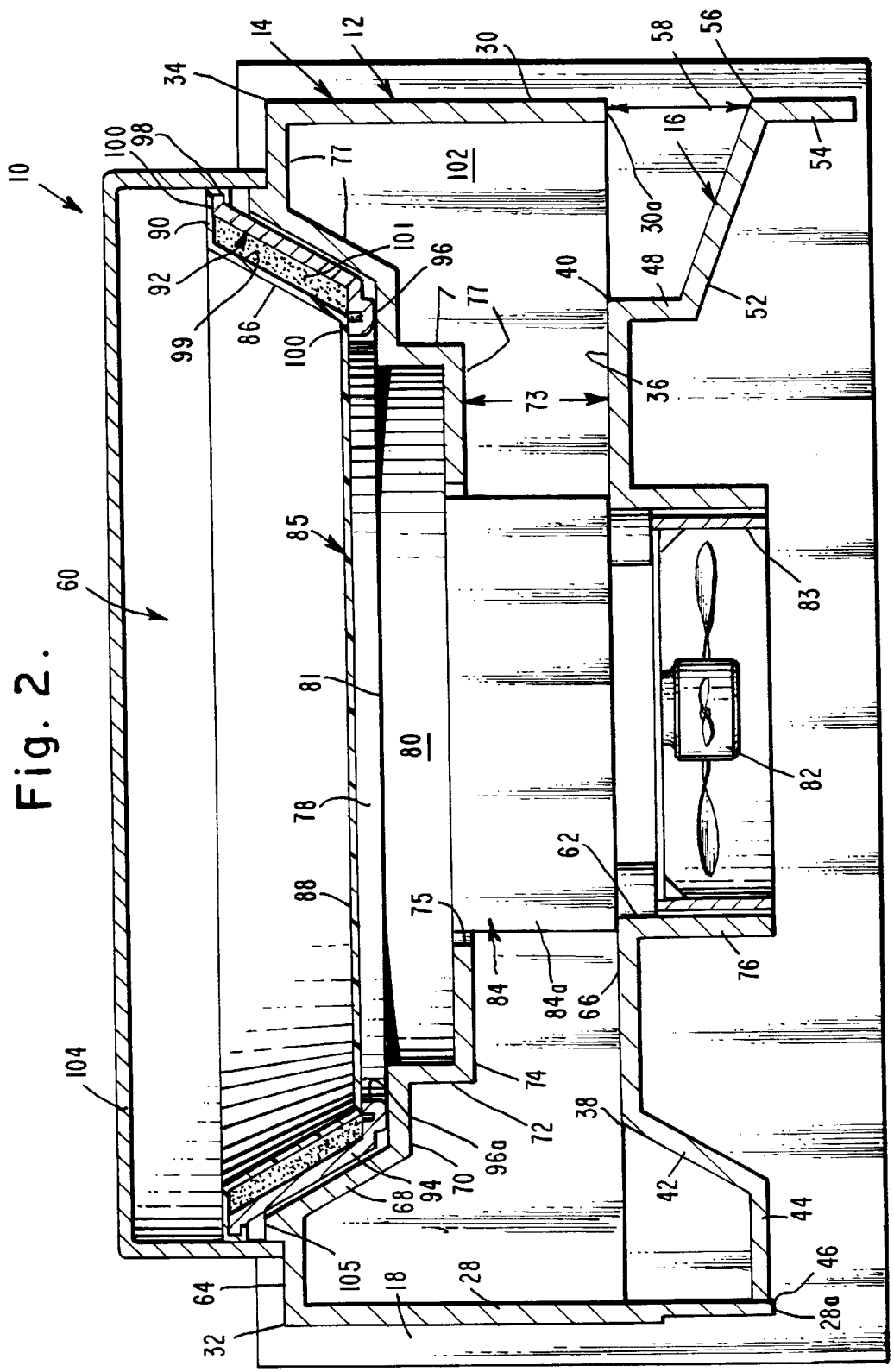
FIG. 2 is a cross-sectional view of the embodiment depicted in FIG. 1, with its front side appearing to the left of the figure, showing one of the sections and its heating and cooling unit.
Figure 3:
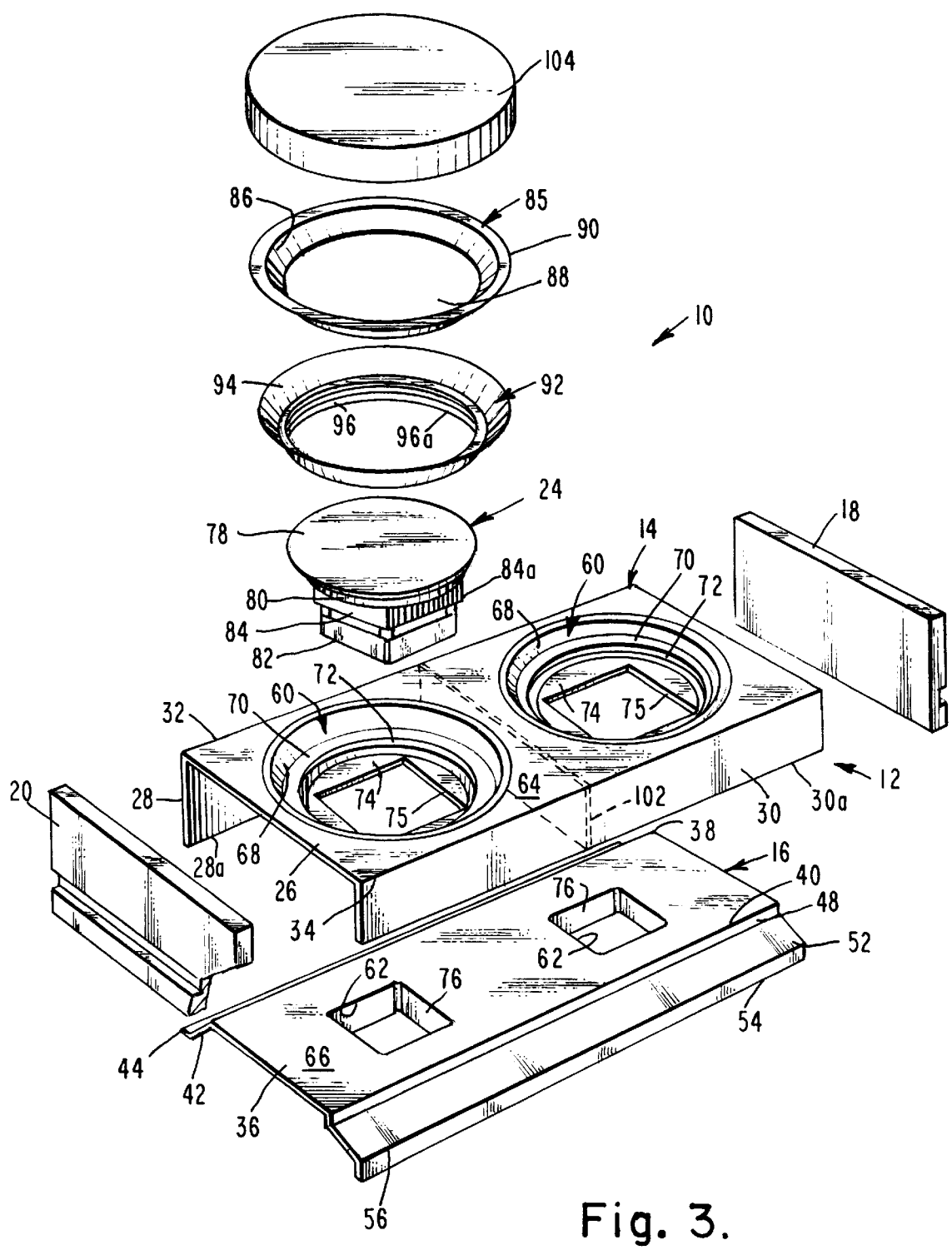
FIG. 3 is an exploded view of the two sections, viewed from its back side, and one of the two heating or cooling units of the embodiment illustrated in FIG. 1.

As illustrated in FIGS. 1–3, a chill-hot buffet tray 10 comprises a housing 12 having an upper portion 14, a lower or base portion 16, and sides or side portions 18 and 20. All portions are secured together in any convenient manner, such as by adhesives or such hardware as screws, angles, and nuts and bolts. A pair of heating and cooling units 22 and 24 open in upper portion 14.

As best shown in FIGS. 2 and 3, upper portion 14 consists of a top panel 26 from which a front panel 28 and a rear panel 30 extend from front and rear edges 32 and 34 downwardly towards base portion 16. Front and rear panels 28 and 30 terminate at end edges 28a and 30a.

Base portion 16 includes a top panel 36 bounded by front and rear edges 38 and 40. Extending from front edge 38 is a downwardly and forwardly sloping front section 42, to which a forwardly directed section 44 is secured. At its end edge 44a, section 44 abuts against and, if desired is bonded, to edge 28a of front panel 28 of upper portion 14 to form an intersection 46 (see FIG. 2). At rear edge 40, a downwardly directed section 48 extends from the rear edge of top panel 36 and continues into a downwardly and rearwardly extending sloping rear section 52 and a terminal section 54. For aesthetic purposes, section 54 and rear panel 30 lie in the same plane. Sections 52 and 54 are joined at an angular bend 56. As best shown in FIG. 2, end edge 30a of upper portion rear panel 30 is positioned substantially at the same level as base portion top panel 36 and thereby forms a space 58 which forms an air exhaust for tray 10.

Both upper portion 14 and base portion 16 are each illustrated as being provided with pairs of respective openings 60 and 62 (see FIG. 2) opening in their respective upper surfaces 64 and 66 to accommodate pairs of heating and cooling units 22 and 24. It is to be understood that one or more than two pairs of aligned openings may be provided to accommodate as few or as many heating and cooling units as may be required or desired. Each upper portion opening 60 embraces a series of connected walls opening from top panel 26, comprising a sloped annular wall 68, an intermediate surface 70, an upstanding annular wall 72, and a lower surface 74. Lower surface 74 is spaced from top panel 36 of the base portion by a separation 73, and has a rectangularly shaped opening 75 to accommodate an interfitting component of the heating and cooling unit. Intermediate surface 70 and lower surface 74 are generally parallel to top surface 64. Each base portion opening 62 has a downwardly extending walled periphery or baffle 76.

A thermally insulating coating 77 may be placed on the underside surfaces of upper portion 14, viz., upper surface 64, sloped wall 68, intermediate surface 70, upstanding wall 72 and lower surface 74 to increase the thermal isolation of heat conducting plate 78 and the transfer of heat to or from plate 78. In addition, or alternatively, the material of upper portion 14 may be selected for its thermally insulative properties.

The several heating and cooling units 24 are disposed to fit into and be retained in their openings 60 and 62. Unit 24 is of conventional construction and comprises a heat conducting plate 78 which is designed to be heated or cooled. Plate 78 is bonded to a thermoelectric heat pump 80, commonly known as Peltier thermoelectric heat pump, by a thermal adhesive 81. A finned heat sink 84, having fins 84a extending from front to rear panels 28 and 30, is also bonded to heat pump 80, likewise, for example, by a thermal adhesive. The circumferential shape of the finned heat sink and the shape of lower surface opening 75 are matched to permit a close interfit between the two. Peltier heat pump 80 is configured to fit closely within upstanding annular wall 72 and to rest on lower surface 74, and its thickness is such as to enable its upper surface to be flush with intermediate surface 70. Plate 78 has a circumference which is larger in diameter, for example if circular, than that of the heat pump, to enable it to rest on lower surface intermediate surface 70.

A fan 82 is housed within a frame 83, which is secured to finned heat sink 84 in any convenient manner and which is enclosed by wall 76 of base portion 16. Because frame 83 has an open structure, wall 76 seals off the open structure to more efficiently direct air from the fan to the finned heat sink with minimum loss. It is evident, therefore, that the fan will draw air into the finned heat sink from the entry provided by intersection 28a, and force the air therethrough for exhaust through space 58 between edge 30a of rear panel 30 and sections 48, 52 and 56 of the base portion.

The transfer of heat to or from heat conducting plate 78 is determined mostly by the designs of finned heat sink 84, fan 82 and Peltier heat pump 80. Specifically, the number of fins 84a and the total surface area in heat sink 84, the volume of air that fan 82 can move, and the capacity of Peltier heat pump 80 are selected and correlated to provide the most efficient transfer of heat.

Food is retained in a pan 85. The pan has a sloped annular wall 86, a bottom 88 surrounded thereby and joined thereto, and a rim 90 terminating the wall. A thermally insulating liner or jacket 92 also has a sloped annular wall 94 which is terminated by a ridge 96 at its bottom and a rim 98 at its upper edge. Pan and liner walls 86 and 94 are parallel to but spaced from one another, so as to provide a gap 99 therebetween. Preferably, gap 99 is filled with a thermal foam; however, it may be left open to constitute an air gap. In both cases, gap 99, whether or not filled with foam, acts to augment the thermal insulation. Ridge 96 is generally U-shaped in cross-section, and is configured as a ring so as to present an annular opening 96a therein. The ridge is bonded to pan bottom 88 and liner rim 98 is also bonded to pan rim 90, with indicium 100 identifying both. The bonding construction is such as to effect a hermetic seal and prevent moisture from contacting the exterior surface of the pan at its side wall 86. Pan rim 90 may also be crimped about liner rim 98 to enhance the affixation between the pan and the liner. The thickness of ridge 96 and its annular opening 96a are correlated to the thickness and diameter of plate 78, in order that the ridge will closely embrace the plate. The ridge thus provides a socket which locates pan 85 centrally over heat conducting plate 78, and further insulates the otherwise exposed edges of plate 78. This arrangement provides a continuous and enhanced insulation between the heat conducting plate and the pan.

To prevent undesired mixing of air among the several heating and cooling units, a baffle 102 may be secured to the underside of upper portion 14 between openings 60 and 62.

A cover 104, for example of acrylic plastic, is disposed to be placed over the pan and liner unit to maintain the temperature and hygiene of the food therein. A raised annulus 105 helps to center cover 104 about the pan.

The materials of the several heat conducting components are selected to have good thermal conductivity, e.g., aluminum and stainless steel. The serving pan may be formed of aluminum, stainless steel, Pyrex® thermal glass and Corningware®.

Figure 4:
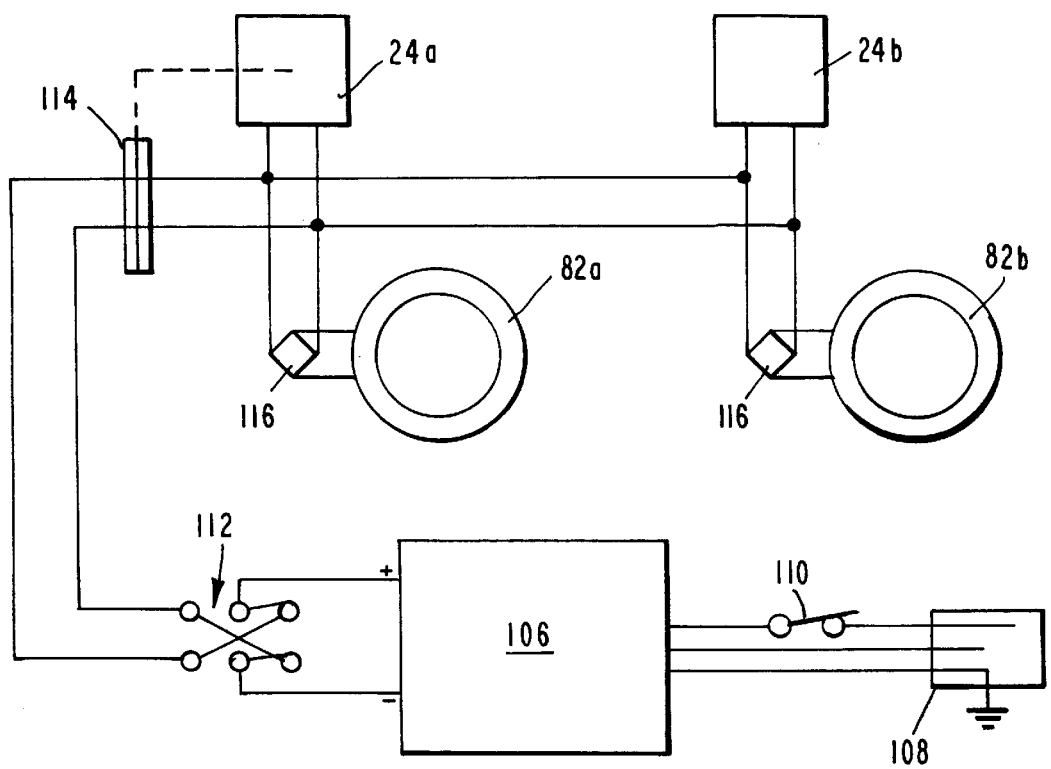
FIG. 4 depicts a wiring schematic useful to power the heating and cooling units shown in FIGS. 1–3.

Control of the heating and fans is provided by the circuitry schematically depicted in FIG. 4. A power supply and rectifier unit 106 is coupled to a source of alternating current through a three-prong electrical plug 108 and an off-on switch 110. Unit 106 converts the alternating current to direct current which is directed through a double-pole, double throw cross-wired switch 112 and a temperature limit thermostat 114, respectively to Peltier temperature controlling heat pumps 24a and 24b and fans 82a and 82b. The fans are electrically coupled into the circuitry through rectifier bridges 116. The temperature limit thermostat protects the heat pumps against excessive cooling and heating. Double-pole, double-throw cross-wired switch 112 enables heat pumps 24a and 24b to operate to cool or to heat the pans, depending upon the throw of the switch arm. If heat pumps 24a and 24b are to be independently controlled, e.g., one to heat and the other to cool, separate switches would be used in place of the double-pole, double-throw cross-wired switch.

Although the invention has been described with respect to particular embodiments thereof, it should be realized that various changes and modifications may be made therein without departing from the spirit and scope of the invention.

What is claimed is:

1. A heating and cooling tray for serving food comprising:

a pair of temperature controlled units having air flow passageways therein; and a housing supporting said temperature controlled units and including a upper portion, a base portion, and a pair of sides for securing said upper portion and said base portion together as a unit, said upper portion including a top panel having front and rear edges, a front panel secured to said front edge, and a rear panel secured to said rear edge, said upper portion top panel having a pair of means therein defining openings for respectively receiving and supporting said pair of temperature controlled units, said base portion including a top panel having front and rear edges, a front panel secured to said front edge and coupled at an intersection with said upper portion front panel, and a rear panel secured to said rear edge and spaced from said upper portion rear panel to form means defining a space therebetween, said base portion top panel having a pair of means therein defining openings for respectively receiving said pair of temperature controlled units, whereby an air flow path extends from said intersection between said upper and base portions front panels, through said base panel opening means and said passageways in said temperature controlled units, and out through said space means between said upper and base portions rear panels.

2. A tray according to claim 1 in which:

each of said pair of temperature controlled units include a heat conducting plate, a thermoelectric heat pump thermally coupled to said heat conducting plate, a finned heat sink thermally coupled to said heat pump and a fan secured to said finned heat sink for directing air thereto; and said respective opening means in said upper portion and in said base portion are separated from one another by means defining a separation; and said opening means pairs in said upper portion respectively supporting said heat conducting plates and said thermoelectric heat pumps, said opening means pairs in said base portion respectively supporting said fans, and said finned heat sinks residing in said separation means.

3. A tray according to claim 2, for each of said upper and lower portions opening means, further including a walled enclosure secured to said base portion opening means for enclosing said fan and for providing an air path to said finned heat sink.

4. A tray according to claim 1 in which:

each of said pair of temperature controlled units include a heat conducting plate, a thermoelectric heat pump thermally coupled to heat conducting plate, a finned heat sink thermally coupled to said heat pump and a fan secured to said finned heat sink for directing air thereto;

said upper portion top panel includes an upper surface through which each of said upper portion opening means extends;

each of said upper portion opening means comprises a sloped annular wall extending from said upper surface towards said base portion, an intermediate surface extending from said sloped annular wall and generally parallel to said upper surface, an upstanding annular wall extending perpendicularly from said intermediate wall, and a lower surface extending from said upstanding wall and generally parallel to said intermediate and upper surfaces and having means defining an opening configured to received said finned heat sink; and said upstanding annular walls and said lower surfaces form enclosures respectively for supporting said heat conducting plates, and said annular opening means forms openings through which said finned heat sinks pass.

5. A tray according to claim 4 further comprising, in paired form for each of said upper and lower portions opening means:

a pan into which food is placeable, said pan including a sloped annular wall, a bottom secured to said sloped annular wall and a rim extending outwardly from said sloped annular wall;

a thermally insulating liner including a sloped annular wall parallel to and spaced from said pan annular wall, an annular ridge which terminates said sloped annular wall, is bonded to said pan bottom and is configured to contact said upper portion intermediate surface, to center said pan bottom over and into contact with said heat conducting plate and to provide insulation for said heat conducting plate, and a rim extending outwardly from said sloped annular wall bonded to said pan rim, thereby to form a hermetically sealed gap between said pan and said liner, said liner sloped annular wall having a configuration that conforms to said upper portion sloped annular wall for enabling facile insertion and removal of each of said pan and liner combinations into each of said upper portion openings.

6. A tray according to claim 5 in which the hermetically sealed gap is filled with a thermally insulating foam.

7. A tray according to claim 5 further including a pair of covers respectively positionable over said pans and configured to surround said pan rims.

8. A tray according to claim 7 further comprising a direct current power supply and electronic circuitry electrically coupling said power supply to said thermoelectric heat pumps and said fans, said electronic circuitry including a double pole, double-throw switch for respectively powering said thermoelectric heat pumps to cool and to heat said heat conducting plates and thence to cool and to heat food in said pans.

9. A tray according to claim 8 in which said electronic circuitry further includes a temperature limit thermostat coupled to said thermoelectric heat pumps for protection thereof against deleterious temperature overloads.

10. A tray according to claim 7 further including a partition secured to and between said upper and base portions, and between said opening means thereof for thermally segregating said pair of temperature controlled units from one another and the air flowing therethrough.

11. A heating and cooling tray for serving food comprising:
a temperature controlled unit having an air flow passageway therein;
an upper portion having means therein defining an opening for receiving and supporting said temperature controlled unit;
a base portion having means therein defining an opening for receiving said temperature controlled unit; and
said upper and base portions being secured together to form an enclosed housing with an air flow path having an entry at said base portion opening means and an outlet, for flow of air through said entry and said base portion opening means, said passageway in said temperature controlled unit, and out through said outlet.

12. A tray according to claim 11 in which:
said temperature controlled unit includes a heat conducting plate, a thermoelectric heat pump thermally coupled to heat conducting plate, a finned heat sink thermally coupled to said heat pump and a fan secured to said finned heat sink for directing air thereto;
said respective opening means in said upper portion and in said base portion are separated from one another by means defining a separation; and
said opening means in said upper portion supporting said heat conducting plate and said thermoelectric heat pump, said opening means in said base portion supporting said fan, and said finned heat sink residing in said separation means.

13. A tray according to claim 11 in which:
said temperature controlled unit includes a heat conducting plate, a thermoelectric heat pump thermally coupled to heat conducting plate, a finned heat sink thermally coupled to said heat pump and a fan secured to said finned heat sink for directing air thereto;
said upper portion includes an upper surface through which said upper portion opening means extends;
said upper portion opening means comprises a sloped annular wall extending from said upper surface towards said base portion, an intermediate surface extending from said sloped annular wall and generally parallel to said upper surface, an upstanding annular wall extending perpendicularly from said intermediate wall, and a lower surface extending from said upstanding wall and generally parallel to said intermediate and upper surfaces and having means defining an opening configured to received said finned heat sink; and
said upstanding annular wall and said lower surface form an enclosure for supporting said heat conducting plate, and said annular opening means forms an opening through which said finned heat sink passes.

14. A tray according to claim 13 further comprising:
a pan into which food is placeable, said pan including a sloped annular wall, a bottom secured to said sloped annular wall and a rim extending outwardly from said sloped annular wall;
a thermally insulating liner including
a sloped annular wall parallel to and spaced from said pan annular wall,
an annular ridge which terminates said sloped annular wall, is bonded to said pan bottom and is configured to contact said upper portion intermediate surface, to center said pan bottom over and into contact with said heat conducting plate and to provide insulation for said heat conducting plate, and
a rim extending outwardly from said sloped annular wall bonded to said pan rim,
thereby to form a hermetically sealed gap between said pan and said liner,
thermally insulating foam disposed between said pan and said liner filling the hermetically sealed gap,
said liner sloped annular wall having a configuration that conforms to said upper portion sloped annular wall for enabling facile insertion and removal of said pan and liner combinations into said upper portion openings.

15. A tray according to claim 14 further including a cover which is disposable over said pan and configured to surround said pan rim.

16. A tray according to claim 15 further comprising a direct current power supply and electronic circuitry electrically coupling said power supply to said thermoelectric heat pump and said fan, said electronic circuitry including a double pole, double-throw switch for powering said thermoelectric heat pump to cool and to heat said heat conducting plate and thence to cool and to heat food in said pan.

17. A tray according to claim 16 in which said electronic circuitry further includes a temperature limit thermostat coupled to said thermoelectric heat pump for protection thereof against deleterious temperature overloads.

18. In a heating and cooling tray for serving food, the improvement comprising:
a first portion including means for defining an opening;
a second portion including means for defining an opening;
a temperature controlled unit including a heat conducting plate, a thermoelectric heat pump thermally coupled to said heat conducting plate, a finned heat sink thermally coupled to said heat pump and a fan secured to said finned heat sink for directing air thereto;
said opening means in said portions being aligned and separated from one another by means defining a separation; and
said opening means in said first portion supporting said heat conducting plate and said thermoelectric heat pump, said opening means in said second portion supporting said fan, and said finned heat sink residing in said separation means.

19. The improvement according to claim 18 in which:
said first portion includes an upper surface through which said first portion opening means extends;
said first portion opening means comprises a sloped annular wall extending from said upper surface towards said second portion, an intermediate surface extending from said sloped annular wall and generally parallel to said upper surface, an upstanding annular wall extending perpendicularly from said intermediate wall, and a lower surface extending from said upstanding wall and generally parallel to said intermediate and upper surfaces and having means defining an opening configured to received said finned heat sink; and said upstanding annular wall and said lower surface form an enclosure for supporting said heat conducting plate, and said annular opening means forms an opening through which said finned heat sink pass.

20. The improvement according to claim 19 further comprising:
a pan into which food is placeable, said pan including a sloped annular wall, a bottom secured to said sloped annular wall and a rim extending outwardly from said sloped annular wall;
a thermally insulating liner including
a sloped annular wall parallel to and spaced from said pan annular wall,
an annular ridge which terminates said sloped annular wall, is bonded to said pan bottom and is configured to contact said first portion intermediate surface, to center said pan bottom over and into contact with said heat conducting plate and to provide insulation for said heat conducting plate, and
a rim extending outwardly from said sloped annular wall bonded to said pan rim, thereby to form a hermetically sealed gap between said pan and said liner,
said liner sloped annular wall having a configuration that conforms to said upper portion sloped annular wall for enabling facile insertion and removal of said pan and liner combination into said first portion opening.

21. The improvement according to claim 20 in which the hermetically sealed gap is filled with a thermally insulating foam.

22. In a heating and cooling tray for serving food, the improvement comprising:
a pan into which food is placeable, said pan including a sloped annular wall, a bottom secured to said sloped annular wall and a rim extending outwardly from said sloped annular wall; and
a thermally insulating liner including
a sloped annular wall parallel to and spaced from said pan annular wall,
an annular ridge which terminates said sloped annular wall, is bonded to said pan bottom, and
a rim extending outwardly from said sloped annular wall bonded to said pan rim, thereby to form a hermetically sealed, thermally insulating gap between said pan and said liner.

23. The improvement according to claim 22 in which the hermetically sealed gap is filled with a thermally insulating foam.

24. The improvement according to claim 22 further comprising:
a first portion including means for defining an opening;
a second portion including means for defining an opening;
a temperature controlled unit including a heat conducting plate, a thermoelectric heat pump thermally coupled to said heat conducting plate, a finned heat sink thermally coupled to said heat pump and a fan secured to said finned heat sink for directing air thereto; and
said opening means in said portions being aligned and separated from one another by means defining a separation; and
said opening means in said first portion supporting said heat conducting plate and said thermoelectric heat pump, said opening means in said second portion supporting said fan, and said finned heat sink residing in said separation means.

25. The improvement according to claim 24 in which:
said first portion includes an upper surface through which said first portion opening means extends;
said first portion opening means comprises a sloped annular wall extending from said upper surface towards said second portion, an intermediate surface extending from said sloped annular wall and generally parallel to said upper surface, an upstanding annular wall extending perpendicularly from said intermediate wall, and a lower surface extending from said upstanding wall and generally parallel to said intermediate and upper surfaces and having means defining an opening configured to received said finned heat sink;
said upstanding annular wall and said lower surface form an enclosure for supporting said heat conducting plate, and said annular opening means forms an opening through which said finned heat sink pass;
said liner ridge being configured to contact said first portion intermediate surface, to center said pan bottom over and into contact with said heat conducting plate and to provide insulation for said heat conducting plate; and
said liner sloped annular wall having a configuration that conforms to said first portion sloped annular wall for enabling facile insertion and removal of said pan and liner combinations into said first portion openings.

* * * * *